United States Patent

Shouman

[15] 3,638,483
[45] Feb. 1, 1972

[54] METHOD AND MEANS FOR REDUCING POWER REQUIREMENTS OF SUPERSONIC WIND TUNNELS

[72] Inventor: Ahmad R. Shouman, 1710 S. Pecos St., Las Cruces, N. Mex. 88001

[22] Filed: June 1, 1970

[21] Appl. No.: 42,264

[52] U.S. Cl. ..................................................73/147
[51] Int. Cl. ..........................................G01m 9/00
[58] Field of Search.....................................73/147

[56] References Cited

UNITED STATES PATENTS 2,696,110   12/1954   Eggers, Jr. ..............................73/147
2,799,161   7/1957   Greene et al. ..........................73/147
2,911,787   11/1959   Barry.......................................73/147

Primary Examiner—S. Clement Swisher
Attorney—William S. Dorman

[57] ABSTRACT

A system for reducing the power requirements of supersonic wind tunnels of the type having variable geometry diffusers which involves especially a pumping system which is capable of creating the pressure ratio across the tunnel necessary for starting conditions in a blow down configuration at small mass flow rate of air and which at the same time is sufficiently variable or flexible that it is capable of pumping the designed mass flow rate of air through the tunnel at a lower pressure ratio when the tunnel achieves a steady-state condition.

6 Claims, 4 Drawing Figures

INVENTOR.
AHMAD R. SHOUMAN

ATTORNEY

METHOD AND MEANS FOR REDUCING POWER REQUIREMENTS OF SUPERSONIC WIND TUNNELS

The present invention relates generally to supersonic wind tunnels of either the open or closed loop type and capable of the continuous operation. More particularly, this invention applies to wind tunnels equipped with variable geometry diffusers to reduce the power requirements of the tunnel and those equipped as well with variable geometry nozzles to permit operation at different test section Mach numbers that can be varied in steps or continuously.

The fact that variable geometry diffusers can reduce the power requirement of supersonic wind tunnels has been known for a long time. E. P. Neumann and F. Lustwerk in their paper, "High-Efficiency Supersonic Diffusers," published in the *Journal of Aeronautical Sciences*, June, 1951, pp. 369–374, make the statement: "A reduction in power requirement of 60 percent could be achieved in the limit with the adjustable diffuser." However, Pope and Goin in their text book, *High-Speed Wind Tunnel Testing*, published by John Wiley and Sons, Inc., New York, 1965, make the statement: "- Getting a little ahead of ourselves to consider a practical case, we note that several high-speed wind tunnels have incorporated this idea of an adjustable second throat, always with a degree of success far below ideal. As a matter of fact, the usefulness of such a technique has generally been so limited that many tunnels with variable second throats do not use them. High tunnel starting power requirements must be provided and when they are, the power requirements for operation are no longer a problem."

This invention recognizes that the limiting factor in achieving the theoretical power saving is the pumping characteristics of the compressors normally used for operating wind tunnels.

Supersonic wind tunnels use supersonic-subsonic diffusers to effect a reduction in wind tunnel power requirement by obtaining a pressure recovery in the diffuser. The diffuser is usually of the convergent-divergent shape. In order to start the tunnel, that is, obtain and maintain the design supersonic Mach number in the test section, a minimum diffuser throat area is necessary. Once the tunnel is started and the shock system is past the diffuser throat, it is possible to reduce the area of the diffuser throat and thus improve the diffuser efficiency and increase the pressure recovery in the diffuser system.

Heretofore, attempts to use the variable throat diffuser to reduce the power requirement during steady-state operation for continuous operation supersonic wind tunnels have been made on wind tunnel systems which have been dependent on compressors as the primary devices for moving the air. It is because of the characteristics of the compressors and their drives which have been and are used, that the difference in power requirements between startup and steady-state operation of the tunnels was not significant.

It is a principal object of this invention to provide an appropriate pumping system for supersonic wind tunnels. It will be possible with such pumping systems to achieve large power savings for supersonic wind tunnel operation, as well as being able to operate with a continuously varying Mach number that can simulate true flight path within the design capability of the tunnel.

Another object of the invention is to provide the starting techniques and the method of switching to steady-state operation for a supersonic wind tunnel. The utilization of such techniques will allow a great reduction in the power requirement of the tunnel or in other words permits a larger test section for any available power.

Other and further objects and advantageous features of the present invention will hereinafter more fully appear in connection with a detailed description of the drawings in which.

Figure 1:
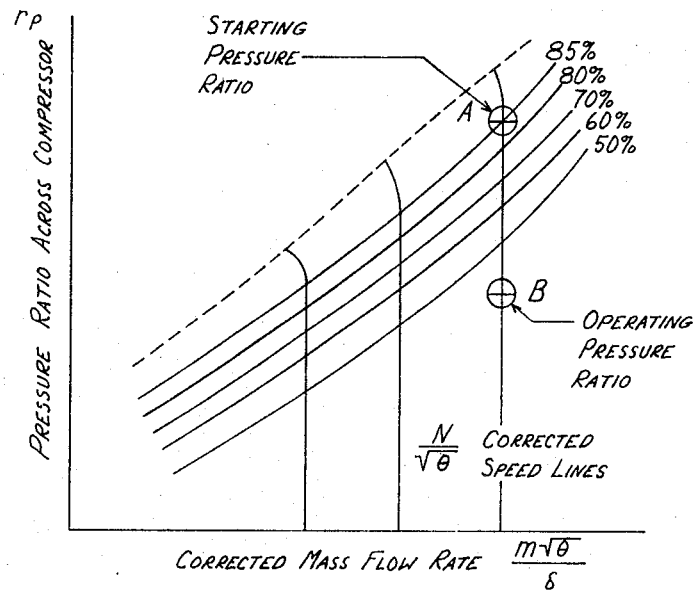
FIG. 1 is a diagram illustrating the performance characteristics of typical compressors.

Referring to the drawings in detail, FIG. 1 shows a typical compressor performance chart. The abscissa of the graph represents the corrected mass flow rate through the compressor $m\sqrt{\theta}/\delta$ where $m$ is the rate of mass flow through the compressor in units of mass per unit of time, e.g., lbs./sec.; $\theta$ is the temperature ratio between the absolute temperature of the air at inlet to the compressor to the standard absolute temperature at compressor inlet and $\delta$ is the ratio of the absolute pressure of the air at inlet to the compressor to the standard pressure at inlet to the compressor.

The ordinate of the graph represents the variable $r_t$, the ratio between the pressure at the discharge from the compressor to the pressure at the inlet of the compressor. The lines labeled $N/\sqrt{\theta}$, or corrected speed lines, show the performance of the compressor at constant corrected speed where N is speed in revolutions per minute or can be replaced by compressor tip speed in units of length per unit of time e.g., ft./sec. The lines labeled with the various percentage values represent the constant efficiency lines of the compressor. In order to design a supersonic wind tunnel for a given test section area, test section Mach number, at a given test section pressure and temperature, the compressor system should be capable of passing the required corrected mass flow. Also, in order for the tunnel to start, the compressor system should be capable of producing the required starting pressure ratio. Hence the compressor would be operating at point (A) on its performance curve at a relatively high efficiency. By the use of variable geometry diffusers, the steady-state operating pressure ratio can be reduced below the starting pressure ratio. However, the corrected mass flow remains the same. Hence, the compressor will be operating at point (B) on the compressor map. Although the compressor pressure ratio at (B) is significantly lower than at (A), the power requirement of the compressor at (B) is substantially the same as at (A) because of the reduction in the compressor efficiency as seen from the figure. This explains the statement by Pope and Goin mentioned earlier.

The Mach number is one of the most important dimensionless numbers governing supersonic flow and is defined as the ratio between the stream velocity and the local velocity of sound in the stream. Other important dimensionless factors in the study of aerodynamics are:

1. the Reynolds number defined as $VL\rho/\mu$

Figure 3:
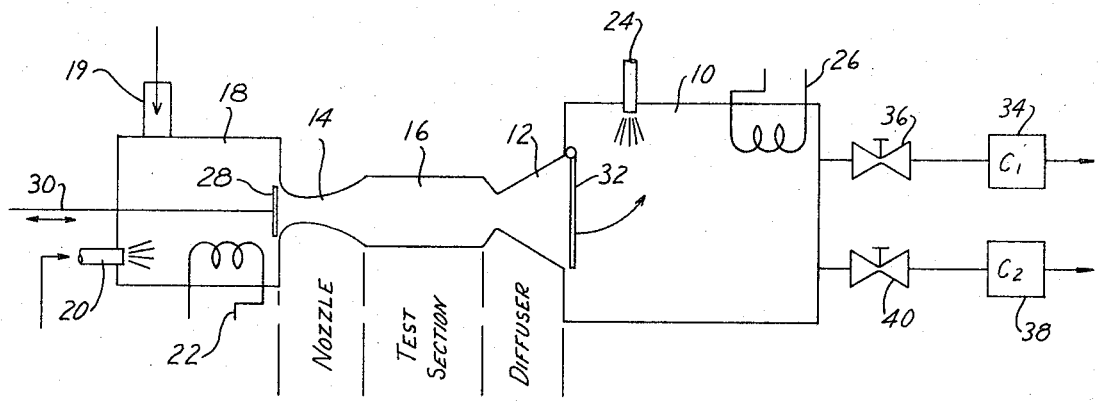
FIG. 3 is a semidiagrammatical illustration of a nonreturn, continuous operation, supersonic wind tunnel embodying the present invention.

Where:
- $V =$ stream velocity
- $L =$ characteristic length of the system considered
- $\mu =$ viscosity of the stream
- $\rho =$ density of the stream 2. the Prandtl number defined as $C_p\mu/k$ Where:
- $C_p =$ specific heat at constant pressure of the gas stream
- $k =$ thermal conductivity of the gas stream 3. the Nusselt number defined as $hL/k$ Where:
- $h =$ convection heat transfer coefficient Referring now to FIG. 3, the disclosed supersonic wind tunnel utilizes a plenum chamber 10 at the exit end of a supersonic variable geometry diffuser 12. The wind tunnel also includes a nozzle 14 and a test section proper 16 of the tunnel. The nozzle and test section could be fixed or variable geometry. An upstream plenum chamber 18 can be included or not depending on the need. Air is introduced to the chamber 18 through the line 19. The upstream plenum chamber can be used to regulate the upstream stagnation pressure of the tunnel. It can act as a combustion chamber for the open tunnel where fuel can be added through line 20 and burned therein, thereby increasing the stagnation temperature of the air. The fuel could be dry powdered coal thus avoiding the problem of moisture condensation. The upstream plenum chamber can also act as a housing for an upstream heat exchanger 22 for closed or open loop tunnels. The heat exchanger can utilize a secondary fluid, a pebble bed, an electric resistance or arc or any other suitable form of heating or cooling as desired.

The downstream plenum chamber 10 acts as a reservoir. The factors necessary to determine the volume of the reservoir will be clear later. It can also serve as a spray chamber for the open loop tunnel where water can be supplied through line 24 for thus cooling the airstream before entering the pumping system. It can act as a housing for a downstream heat exchanger 26 for removing heat from the stream. The latter heat exchanger could be of any preferred design.

A valve 28, operable by the handle 30, is placed upstream of the nozzle 14 at the exit of the upstream plenum chamber 18 and/or a valve 32 is provided at the entrance to the downstream plenum chamber 10. The utilization of either of these valves or both for achieving the objective of this invention will be clear.

A pumping system 34 ($C_1$) capable of producing a pressure ratio higher than the starting pressure ratio with relatively low mass flow rate is connected to the downstream plenum chamber 10 through valve 36. Another pumping system 38 ($C_2$) capable of handling the tunnel operating mass rate of flow at the operating pressure ratio is connected to the downstream plenum chamber 10 through valve 40. The pumping systems could be one system capable of the two configurations as will be explained later.

Figure 4:
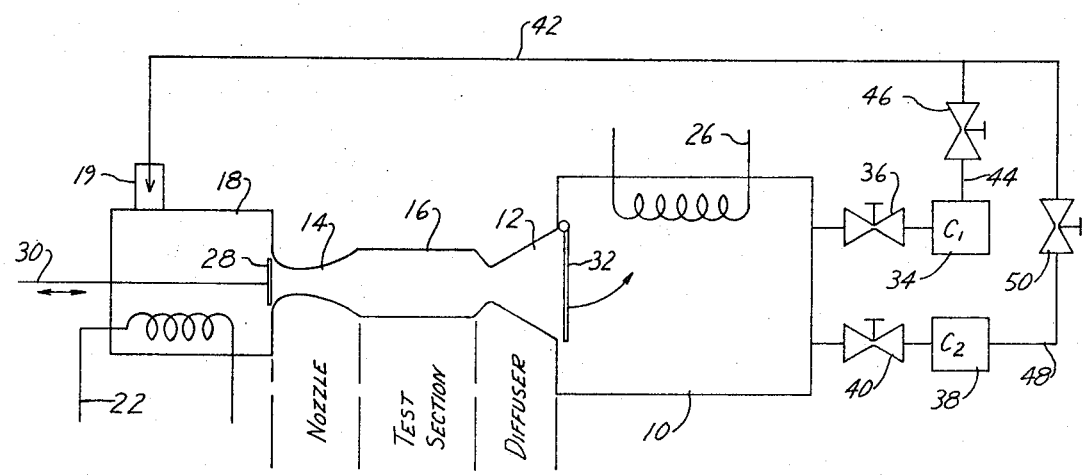
FIG. 4 is a semidiagrammatic illustration similar to FIG. 3 showing, however, a closed loop wind tunnel.

Referring now to FIG. 4, the same elements are designated by the same reference characters. In this modification, or closed loop design, the air leaving pumping systems 34 or 38 is returned to the air inlet 19 by means of the return line 42. System 34 connects with line 42 through line 44 and the valve 46; system 38 similarly connects with line 42 through line 48 and valve 50. It should be understood that the valves 46 and 50 should be either open at all times or should correspond with the open and/or closed conditions of their associated valves 36 and 40, respectively. Needless to say, valve 46 or 50 should never be completely closed when its associated valve 36 or 40, respectively, is open or partly open.

Using the forementioned disclosure with all or some of its components, the following describes the procedure required to achieve the objective of this invention:

a. Valve 28 or 32 or both according to the tunnel design is closed. Depending on the stagnation pressure upstream of the supersonic nozzle 14 or in the upstream plenum chamber 18 when present, the pressure in the downstream plenum chamber 10 is set to a level sufficient to ensure that the tunnel can start and that the starting shock wave system will be situated downstream of the diffuser throat. Depending on the tunnel design, vacuum pumps, air ejectors, steam ejectors, compressors, similar pumping devices or combination of such could be used to accomplish the above. Valve 28 or 32 or both as required is opened allowing the tunnel to start as a blowdown tunnel.

b. Once the tunnel has started as described in (a), the diffuser throat can be adjusted to the size producing maximum diffuser efficiency.

Considering the technique described in (a) and (b) above, it becomes clear that it is necessary to provide a gas-pumping system that can produce the high-pressure ratio for the tunnel starting with low mass flow which we shall call configuration ($C_1$), and another configuration ($C_2$) that can pump the designed mass flow rate of the tunnel against the steady-state low-operating pressure ratio of the tunnel. Using configuration ($C_1$) the pressure ratio required to start the tunnel is produced as described before. The time required to ready the tunnel for starting is of course dependent on the mass flow rate that configuration ($C_1$) can handle as well as the reservoir size. After the tunnel is started as described before, the diffuser throat area is changed allowing the diffuser efficiency to improve. As the downstream plenum chamber pressure rises, the gas-pumping system is switched to configuration ($C_2$), e.g., by opening the valve 40. The size of the plenum chamber should be large enough to allow the time required to switch in configuration ($C_2$), e.g., opening valve 40 without allowing the pressure in the downstream plenum chamber to get high enough to unstart the tunnel.

Figure 2:
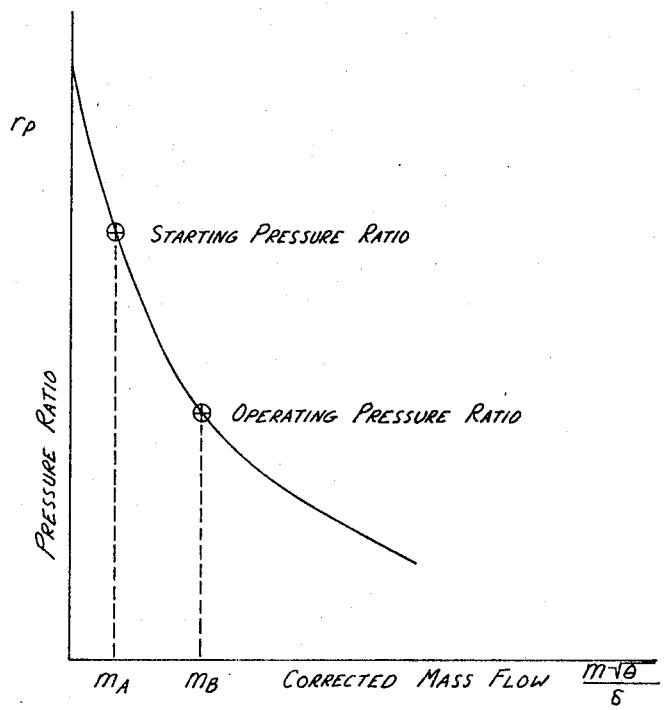
FIG. 2 is a diagram illustrating the performance characteristics of a typical steam ejector.

As stated before the two pumping configurations ($C_1$) and ($C_2$) could be separate pumping systems or one capable of producing the desired properties. In order to illustrate the latter, we shall here demonstrate the use of a particular system meeting these criteria, namely, a steam ejector. FIG. 2 illustrates typical steam ejector performance characteristics showing the corrected mass flow rate of air which the ejector can pump against a given pressure ratio. Using conventional methods of wind tunnel design, the size of the tunnel test section is determined by the mass flow rate $m_A$ that the ejector can handle at the pressure ratio necessary to start the tunnel. Using the techniques advocated in this invention, the sizing of the tunnel test section is determined by the mass flow rate $m_B$, which is quite larger than $m_A$, that the ejector can handle at the steady-state operating pressure ratio of the tunnel. In other words, since $r_P$ is smaller at the steady-state operating conditions, the steam ejector (or equivalent ejector) can pump a greater quantity of air or $m_B$ thus meeting the desired conditions described herein. This illustrates that by the use of this invention it becomes possible to increase the test section area of a supersonic wind tunnel for a given power or reduce the power requirements of a tunnel with a given test section area.

EXAMPLE

Consider a wind tunnel that is to be designed for a Mach number of 2.5 with a test section area of 1 square foot and with an upstream stagnation pressure of 1 standard atmosphere and stagnation temperature of 60° F. For such a tunnel the mass flow of air necessary for steady-state operation is 18.73 lbs./sec. The pressure ratio necessary for starting is 2.004, which means that when the pressure in chamber 18 is 1 atmosphere as required, the pressure in chamber 10 has to be maintained at 0.499 atmosphere for the tunnel to start. Without the teachings of this invention, it would be necessary to use a pumping system capable of pumping 18.73 lbs./sec. of air against a pressure ratio of 2.004; this would require a theoretical 726.5 horsepower.

With the use of the variable geometry diffuser as outlined above, it is feasible to achieve 90 percent pressure recovery at steady-state operation which means that the pressure in chamber 10 can be kept at 0.9 atmosphere while maintaining the tunnel operation. A pumping system to handle the necessary mass flow rate (18.73 lbs./sec.) against this pressure ratio (1.11) would only require 101.1 HP which shows the potential power savings.

It is then quite feasible to use $C_1$ as the large power system (726.5 HP) and $C_2$ as the low power system (101.1 HP) and switch from $C_1$ to $C_2$ after the tunnel starts. This, however, would not take full advantage of the teachings of this invention. To take full advantage of the teachings set forth herein, $C_1$ should be a relatively low power system that can handle say 1 pound of air per second but capable of evacuating the chamber 10 below 0.499 atmosphere. The tunnel is then started in the blowdown fashion and the chamber pressure is permitted to build up after adjusting the diffuser. Then $C_2$ would take over the pumping when the pressure in chamber 10 reaches 0.9 atmosphere.

Whereas the present invention has been described in particular relation to the drawings attached hereto, it should be understood that other and further modifications, apart from those shown or suggested herein, may be made within the spirit and scope of this invention.

What is claimed is:

1. A method of pumping air through a supersonic wind tunnel of the type having a variable geometry diffuser from the starting conditions of the tunnel to the steady-state operating condition thereof which comprises pumping air at a relatively smaller mass flow rate of air and producing a relatively high-pressure ratio across the tunnel necessary for the starting conditions thereof, starting the tunnel as a blowdown tunnel, adjusting said diffuser to produce a lower pressure ratio across the tunnel without unstarting the tunnel, and thereafter pumping air through said tunnel at said lower pressure ratio across the tunnel at a relatively larger mass flow rate of air, thereby producing substantial power savings.

2. The improvement as set forth in claim 1 which includes using a first compressor with high-pressure ratio capabilities under tunnel starting conditions and switching over to a second compressor after the diffuser adjustments necessary to produce the minimum pressure ratio across the tunnel while maintaining running condition, whereby the second compressor can cause the required mass flow rate of air through the tunnel under the desired pressure ratio across the tunnel with substantial power savings when compared to a system using said first compressor operating at all times.

3. The improvement according to claim 1 which involves the use of an ejector capable of producing the pressure ratio necessary for starting across the tunnel and which also which will produce the required mass flow rate of air through the tunnel at the concomitant pressure ratios when the tunnel reaches its steady-state condition.

4. Apparatus for pumping air through a supersonic wind tunnel of the type having a variable geometry diffuser from the starting conditions of the tunnel to the steady-state operating conditions thereof which comprises means for pumping air at a smaller mass flow rate of air and producing the high-pressure ratio across the tunnel necessary for the starting conditions thereof, and, after said tunnel is started as a blowdown tunnel by adjustment of said diffuser, for pumping air through said tunnel at a larger mass flow rate of air and at a lower pressure ratio across the tunnel as a result of the diffuser adjustments, thus producing substantial power savings.

5. The improvement as set forth in claim 4 wherein said pumping means includes a first compressor having high-pressure ratio capabilities under tunnel starting conditions, a second compressor having lower pressure ratio capabilities corresponding to the pressure ratio across the tunnel under steady-state conditions, and means for switching the pumping operation from said first compressor to said second compressor after the adjustment necessary to produce said lower pressure ratio across the tunnel while maintaining running condition, whereby the second compressor can cause the required mass flow rate of air through the tunnel under said lower pressure ratio across the tunnel with substantial power savings when compared to a system using a compressor having the pressure ratio capabilities of said first compressor and operating at all times.

6. The improvement according to claim 4 wherein said pumping means includes an ejector capable of producing the pressure ratio necessary for starting across the tunnel and which also will produce the required mass flow rate of air through the tunnel at the concomitant pressure ratio when the tunnel reaches its steady-state condition.

* * * * *